(12) United States Patent
Luo et al.

(10) Patent No.: US 7,094,849 B2
(45) Date of Patent: Aug. 22, 2006

(54) BULK POLYMERIZATION PROCESS FOR PRODUCING POLYDIENES

(75) Inventors: Steven Luo, Akron, OH (US); William M. Cole, Clinton, OH (US); Yoichi Ozawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 248 days.

(21) Appl. No.: 10/737,591

(22) Filed: Dec. 15, 2003

(65) Prior Publication Data

US 2005/0131174 A1  Jun. 16, 2005

(51) Int. Cl.
*C08F 4/05* (2006.01)

(52) U.S. Cl. .................. 526/164; 526/340.4; 526/335; 502/154; 502/170

(58) Field of Classification Search ............... 526/335, 526/164, 340.4; 502/154, 170
See application file for complete search history.

(56) References Cited

U.S. PATENT DOCUMENTS

| | | | |
|---|---|---|---|
| 3,297,667 A | 1/1967 | von Dohlen et al. ...... 260/82.1 |
| 3,541,063 A | 11/1970 | Throckmorton et al. ... 260/82.1 |
| 3,794,604 A | 2/1974 | Throckmorton et al. .... 252/431 |
| 4,242,232 A | 12/1980 | Sylvester et al. ........... 252/429 |
| 4,260,707 A | 4/1981 | Sylvester et al. ........... 526/114 |
| 4,429,089 A | 1/1984 | Pedretti et al. ............. 526/153 |
| 4,444,903 A | 4/1984 | Carbonaro et al. ......... 502/102 |
| 4,461,883 A | 7/1984 | Takeuchi et al. ............ 526/139 |
| 4,525,549 A | 6/1985 | Carbonaro et al. ........... 526/92 |
| 4,575,538 A | 3/1986 | Hsieh et al. ................ 525/244 |
| 4,699,960 A | 10/1987 | Gordini et al. ............... 526/81 |
| 5,017,539 A | 5/1991 | Jenkins et al. ............. 502/102 |
| 5,428,119 A | 6/1995 | Knauf et al. ................ 526/153 |
| 5,585,440 A | 12/1996 | Yamada et al. ............. 525/193 |
| 6,001,478 A | 12/1999 | Apecetche et al. ......... 428/407 |
| 6,114,483 A | 9/2000 | Coughlin et al. ........... 526/172 |
| 6,130,299 A * | 10/2000 | Sone et al. .................... 526/89 |
| 6,136,919 A | 10/2000 | Zimmer et al. ............. 524/856 |
| 6,180,738 B1 | 1/2001 | Wang et al. ................ 526/200 |
| 6,191,226 B1 | 2/2001 | Matsuda et al. ............ 525/236 |
| 6,239,063 B1 | 5/2001 | Bogdan ...................... 502/325 |
| 6,255,420 B1 | 7/2001 | Dietz, III et al. ........... 526/185 |
| 6,262,196 B1 | 7/2001 | Mecking ..................... 526/114 |
| 6,699,813 B1 | 3/2004 | Luo et al. ................... 502/119 |

FOREIGN PATENT DOCUMENTS

| | | |
|---|---|---|
| CA | 1143711 | 3/1983 |
| EP | 0 011 184 | * 10/1979 |
| EP | 0 127 236 A1 | 12/1984 |
| EP | 0 375 421 A1 | 6/1990 |
| EP | 0 846 707 A1 | 6/1998 |
| EP | 1 134 233 A1 | 10/2000 |
| WO | WO 00/69928 | 11/2000 |

OTHER PUBLICATIONS

Z. Shen et al., *Journal of Polymer Science: Polymer Chemistry Edition*, 1980, vol. 18, pp. 3345-3357.
Hsieh et al., *Rubber Chemistry and Technology*, 1985, vol. 58, pp. 117-145.
English Abstract of JP 06-211916.
English Abstract of JP 08-073515.
English Abstract of JP 10-306113.
English Abstract of JP 11-035633.

* cited by examiner

*Primary Examiner*—Caixia Lu
(74) *Attorney, Agent, or Firm*—Arthur M. Reginelli

(57) ABSTRACT

A method of producing cis-1,4-polydienes, the method comprising the step of contacting conjugated diene monomer with a lanthanide-based catalyst system in the presence of less than 20% by weight of organic solvent based on the total weight of monomer, organic solvent, and resulting polymer, where the lanthanide-based catalyst system is the combination of or reaction product of (a) a lanthanide compound, (b) an organoaluminum hydride, (c) a trihydrocarbylaluminum, and (d) a halogen-containing compound.

21 Claims, No Drawings

BULK POLYMERIZATION PROCESS FOR PRODUCING POLYDIENES

FIELD OF THE INVENTION

This invention relates to a bulk polymerization process for producing cis-1,4-polydienes with a lanthanide-based catalyst system.

BACKGROUND OF THE INVENTION

In bulk polymerization (also called mass polymerization), the reaction medium is typically solventless, i.e., the monomer is polymerized in the absence of any solvent, and, in effect, the monomer itself acts as a diluent. Since bulk polymerization involves only the monomer and catalyst, there is a minimum potential for contamination and the product separation is simplified. It also offers a number of economic advantages including lower capital cost for new plant capacity, lower energy cost to operate, and fewer people to operate. The solventless feature also provides environmental advantages with reduced emissions and wastewater pollution.

Nonetheless, bulk polymerization requires very careful temperature control, and there is also the need for strong and elaborate stirring equipment since the viscosity of the polymerization system can become very high. In the absence of added diluent, the cement viscosity and exotherm effects can make temperature control very difficult. Also, cis-1,4-polybutadiene is insoluble in 1,3-butadiene monomer at elevated temperatures. It is therefore preferred to operate bulk polymerization at a low temperature.

Catalyst systems comprising a lanthanide compound, an alkylating agent, and a halogen source are useful for polymerizing conjugated diene monomers. They are highly stereospecific and can produce conjugated diene polymers having high cis-1,4-linkage contents. The resulting cis-1,4-polydienes have a linear backbone structure, exhibit good green strength, and have excellent viscoelastic properties. The linear backbone structure is believed to provide better tensile properties, higher abrasion resistance, lower hysteresis loss, and outstanding fatigue resistance in rubber compounds. Therefore, these cis-1,4-polydienes are particularly suitable for use in tire components such as sidewall and tread.

Commercially useful lanthanide catalyst systems are three-component catalyst systems that comprise a neodymium carboxylate as the lanthanide compound, either a trialkylaluminum or a dialkylaluminum hydride as the alkylating agent, and an alkylaluminum halide as the halogen source. The molecular weight of cis-1,4-polybutadiene produced by these catalysts is mainly influenced by the polymerization temperature, the monomer concentration, the catalyst concentration, and the ratio of the organoaluminum compound to the lanthanide compound. The molecular weight increases with lower polymerization temperature, higher monomer concentration, lower catalyst concentration, and lower ratio of the organoaluminum compound to the lanthanide compound.

Despite many advantages of the lanthanide-based catalysts, when they are employed in bulk polymerization of 1,3-butadiene, the low polymerization temperature and the high monomer concentration combine to give cis-1,4-polybutadiene having an excessively high molecular weight, which gives an excessively high Mooney viscosity and makes processing difficult.

One approach to reducing the molecular weight of cis-1,4-polybutadiene produced with the lanthanide-based catalyst systems is to employ a very high catalyst concentration or a very high ratio of the organoaluminum compound to the lanthanide compound, both of which result in very high catalyst costs. The use of high catalyst levels also necessitates the removal of catalyst residues from the polymer, yet this removal (also referred to as de-ashing) is time-consuming and adds cost.

The molecular weight of cis-1,4-polybutadiene produced with the lanthanide-based catalyst systems can also be reduced by reducing monomer conversion, because these catalyst systems display pseudo-living behavior so that molecular weight increases with monomer conversion. Unfortunately, reducing monomer conversion decreases productivity. In addition, when the monomer conversion is reduced, the amount of polymer produced with a specified amount of catalyst is also reduced.

The use of dialkylaluminum hydride instead of a trialkylaluminum as the alkylating agent also reduces the molecular weight of cis-1,4-polybutadiene produced with the lanthanide-based catalysts. Dialkylaluminum hydrides are better chain transfer agents than trialkylaluminums, and therefore less dialkylaluminum hydride—as compared to trialkylaluminum—is required to obtain a target molecular weight. Therefore, the use of dialkylaluminum hydrides reduces cost. But, the use of dialkylaluminum hydrides in low-temperature bulk polymerization has serious drawbacks. At low temperatures, dialkylaluminum hydrides are known to exist in oligomeric (such as trimeric) forms, which dissociate to the monomeric form only at elevated temperatures. The oligomeric structures of dialkylaluminum hydrides causes low catalyst activity. And, the resulting polymer has a very broad molecular weight distribution and contains a fraction of ultrahigh molecular weight material, which impacts processing and viscoelastic properties. The broad molecular weight distribution generally results in higher hysteresis loss in rubber vulcanizates. The ultrahigh molecular weight fraction causes high compound Mooney viscosity and high solution viscosity. The high compound Mooney viscosity adversely affects the processability and scorch safety of rubber compounds, and the high solution viscosity is disadvantageous if the cis-1,4-polybutadiene is used in the production of high-impact polystyrene. Moreover, during the synthesis of cis-1,4-polybutadiene, the high solution viscosity causes difficulty in stirring and transferring the polymer cement and reduces the capacity for removing the heat of polymerization, which limits the polymer concentration that can be achieved in production.

Therefore, there is a need to develop an improved bulk polymerization process that utilizes a lanthanide-based catalyst system for producing cis-1,4-polydiene having commercially desirable Mooney viscosities without having to employ high catalyst levels.

SUMMARY OF THE INVENTION

In general the present invention provides a method of producing cis-1,4-polydienes, the method comprising the step of contacting conjugated diene monomer with a lanthanide-based catalyst system in the presence of less than 20% by weight of organic solvent based on the total weight of monomer, organic solvent, and resulting polymer, where the lanthanide-based catalyst system is the combination of or reaction product of (a) a lanthanide compound, (b) an organoaluminum hydride, (c) a trihydrocarbylaluminum, and (d) a halogen-containing compound.

DETAILED DESCRIPTION OF ILLUSTRATIVE EMBODIMENTS

It has now unexpectedly been found that when a lanthanide-based catalyst system is used to polymerize conjugated dienes in a bulk polymerization process, the use of both an organoaluminum hydride and a trihydrocarbylaluminum as alkylating agents is advantageous. For example, the bulk polymerization process of the present invention allows for the production of lower molecular weight cis-1,4-polybutadiene without significantly sacrificing the catalyst activity or increasing the polymer molecular weight distribution. As a result, cis-1,4-polybutadiene having narrow molecular weight distributions and commercially desirable Mooney viscosities can be conveniently produced without using relatively high catalyst levels, or without the need to increase the ratio of organoaluminum to lanthanide. Also, the combination of an organoaluminum hydride and a trihydrocarbylaluminum has, in certain embodiments, been found to provide increased catalytic activity in bulk polymerization.

Accordingly, conjugated dienes are polymerized in a bulk polymerization process in the presence of a lanthanide-based catalyst composition that comprises (a) a lanthanide compound, (b) an organoaluminum hydride, (c) a trihydrocarbylaluminum, and (d) a halogen-containing compound.

Various lanthanide compounds or mixtures thereof can be employed as ingredient (a) of the catalyst composition. Preferably, these compounds are soluble in a hydrocarbon such as aromatic hydrocarbons, aliphatic hydrocarbons, or cycloaliphatic hydrocarbons. Hydrocarbon-insoluble lanthanide compounds, however, are also useful since they can be suspended in the polymerization medium to form the catalytically active species. Further, a Lewis base such as tetrahydrofuran, acetylacetone, pyridine, or an alcohol may be employed as an aid for solubilizing these lanthanide compounds.

The lanthanide compounds include at least one atom of lanthanum, neodymium, cerium, praseodymium, promethium, samarium, europium, gadolinium, terbium, dysprosium, holmium, erbium, thulium, ytterbium, lutetium, and didymium. Preferably, these compounds include neodymium, lanthanum, samarium, or didymium. Didymium is a commercial mixture of rare-earth elements obtained from monazite sand.

The lanthanide atom in the lanthanide compounds can be in various oxidation states including but not limited to the 0, +2, +3, and +4 oxidation states. Trivalent lanthanide compounds, where the lanthanide atom is in the +3 oxidation state, are preferred. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds. Where lanthanide halides, lanthanide oxyhalides, or other lanthanide compounds containing labile halogen atoms are employed, the lanthanide-containing compound can serve as both the ingredient (a) and the ingredient (d), i.e., the halogen-containing compound, of the catalyst composition.

Neodymium compounds are most advantageously employed because the catalysts based on neodymium compounds generally give higher activity than the catalysts based on other lanthanide compounds. Thus, further discussion will focus on neodymium compounds, although those skilled in the art will be able to select similar compounds that are based upon other lanthanide metals.

Suitable neodymium carboxylates include neodymium formate, neodymium acetate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate, neodymium naphthenate, neodymium stearate, neodymium oleate, neodymium benzoate, and neodymium picolinate.

Suitable neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Suitable neodymium organophosphonates include neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate.

Suitable neodymium organophosphinates include neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl) phosphinate, neodymium butyl (2-ethylhexyl)

phosphinate, neodymium (1-methylheptyl) (2-ethylhexyl) phosphinate, and neodymium (2-ethylhexyl) (p-nonylphenyl)phosphinate.

Suitable neodymium carbamates include neodymium dimethylcarbamate, neodymium diethylcarbamate, neodymium diisopropylcarbamate, neodymium dibutylcarbamate, and neodymium dibenzylcarbamate. Suitable neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include neodymium methylxanthate, neodymium ethylxanthate, neodymium isopropylxanthate, neodymium butylxanthate, and neodymium benzylxanthate. Suitable neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Neodymium halides, neodymium pseudo-halides, and neodymium oxyhalides are generally insoluble in hydrocarbons. However, a Lewis base such as tetrahydrofuran, acetylacetone, pyridine, or an alcohol may be employed as an aid for solubilizing these classes of neodymium compounds.

The term organolanthanide compound refers to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Various organoaluminum hydrides can be used as ingredient (b) of the catalyst composition. The term "organoaluminum hydride" refers to any aluminum compound containing at least one aluminum-carbon bond and at least one aluminum-hydrogen bond. It is generally advantageous to employ organoaluminum hydrides that are soluble in hydrocarbons.

A preferred class of organoaluminum hydrides are represented by the general formula $AlH_nR_{3-n}$ (n=1 or 2), where each R is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms.

Suitable types of organoaluminum hydrides include, but are not limited to, dihydrocarbylaluminum hydrides and hydrocarbylaluminum dihydrides. Dihydrocarbylaluminum hydrides are generally preferred.

Suitable dihydrocarbylaluminum hydrides include diethylaluminum hydride, di-n-propylaluminum hydride, diisopropylaluminum hydride, di-n-butylaluminum hydride, diisobutylaluminum hydride, di-t-butylaluminum hydride, di-n-pentylaluminum hydride, dineopentylaluminum hydride, di-n-hexylaluminum hydride, di-n-octylaluminum hydride, bis(2-ethylhexyl)aluminum hydride, dicyclohexylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride. Diisobutylaluminum hydride is particularly preferred due to its low cost and high solubility in hydrocarbons.

Suitable hydrocarbylaluminum dihydrides include ethylaluminum dihydride, n-propylaluminum dihydride, isopropylaluminum dihydride, n-butylaluminum dihydride, isobutylaluminum dihydride, t-butylaluminum dihydride, n-pentylaluminum dihydride, neopentylaluminum dihydride, n-hexylaluminum dihydride, n-octylaluminum dihydride, 2-ethylhexylaluminum dihydride, cyclohexylaluminum dihydride, phenylaluminum dihydride, p-tolylaluminum dihydride, and benzylaluminum dihydride.

Various trihydrocarbylaluminum compounds can be employed as ingredient (c) of the catalyst composition. These trihydrocarbylaluminums are preferably soluble in hydrocarbons.

Suitable trihydrocarbylaluminums include trimethylaluminum, triethylaluminum, tri-n-propylaluminum, triisopropylaluminum, tri-n-butylaluminum, triisobutylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Various compounds, or mixtures thereof, that contain one or more labile halogen atoms can be employed as ingredient (d) of the catalyst composition. These compounds may simply be referred to as halogen-containing compounds. Examples of halogen atoms include, but are not limited to, fluorine, chlorine, bromine, and iodine. A combination of two or more halogen atoms can also be utilized. Halogen-containing compounds that are soluble in hydrocarbons are preferred. Hydrocarbon-insoluble halogen-containing compounds, however, are also useful since they can be suspended in the polymerization medium to form the catalytically active species.

Useful types of halogen-containing compounds, include, but are not limited to, elemental halogens, mixed halogens, hydrogen halides, organic halides, inorganic halides, metallic halides, organometallic halides, and mixtures thereof. The preferred halogen-containing compounds are hydrogen halides, metallic halides, and organometallic halides.

Suitable elemental halogens include fluorine, chlorine, bromine, and iodine. Suitable mixed halogens include iodine monochloride, iodine monobromide, iodine trichloride, and iodine pentafluoride.

Suitable hydrogen halides include hydrogen fluoride, hydrogen chloride, hydrogen bromide, and hydrogen iodide. Suitable organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Suitable inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Suitable metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Suitable organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

The lanthanide-based catalyst composition employed in this invention has very high catalytic activity for polymerizing conjugated dienes into cis-1,4-polydienes over a wide range of catalyst concentrations and catalyst ingredient ratios. The polymer having the most desirable properties, however, is obtained within a narrower range of catalyst concentrations and catalyst ingredient ratios. Further, it is believed that the catalyst ingredients (a), (b), (c), and (d) may interact to form an active catalyst species. Accordingly, the optimum concentration for any one catalyst ingredient is dependent upon the concentrations of the other catalyst ingredients.

The molar ratios of the organoaluminum hydride and the trihydrocarbylaluminum to the lanthanide compound are best described in terms of the ratio of the total equivalents of aluminum atoms in these two compounds to the total equivalents of lanthanide atoms in the lanthanide compound (i.e. Al/Ln). Accordingly, in one preferred embodiment, the molar ratio of the organoaluminum hydride and the trihydrocarbylaluminum to the lanthanide compound (Al/Ln) can be varied from about 4:1 to about 200:1, more preferably from about 10:1 to about 100:1, and even more preferably from about 15:1 to about 75:1.

The molar ratio of the organoaluminum hydride to the trihydrocarbylaluminum can be varied from about 5:95 to about 80:20, more preferably from about 10:90 to about 50:50, and even more preferably from about 15:85 to about 40:60.

The molar ratio of the halogen-containing compound to the lanthanide compound is likewise best described as the ratio of the total equivalents of halogen atoms in the halogen-containing compound to the total equivalents of lanthanide atoms in the lanthanide compound. Accordingly, in one preferred embodiment, the molar ratio of the halogen-containing compound to the lanthanide compound (halogen atom/Ln) can be varied from about 0.5:1 to about 20:1, more preferably from about 1:1 to about 10:1, and even more preferably from about 2:1 to about 6:1.

The catalyst composition is preferably formed by combining or mixing the catalyst ingredients (a), (b), (c), and (d). Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition can be formed by using one of the following methods:

First, the catalyst composition may be formed in situ by separately adding the four catalyst ingredients to the monomer to be polymerized in either a stepwise or simultaneous manner. When the catalyst ingredients are added in a stepwise manner, it is preferable to first add the organoaluminum hydride and the trihydrocarbylaluminum, in either order, followed by the lanthanide compound, and then followed by the halogen-containing compound. After adding the first three catalyst ingredients to the monomer, it is preferable to age the mixture for about 5 minutes prior to adding the last catalyst ingredient, i.e., the halogen-containing compound. Other addition orders may also be used but may not give the same results.

Second, the catalyst composition may be preformed. That is, the four catalyst ingredients are pre-mixed outside the polymerization system either in the absence of monomer or, preferably, in the presence of a small amount of at least one conjugated diene monomer at an appropriate temperature, which is generally from about −20° C. to about 80° C. Specific examples of conjugated diene monomers that can be employed in preforming the catalyst include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene or mixtures thereof. The amount of conjugated diene monomer that is used for preforming the catalyst can range from about 1 to about 500 moles, more preferably from about 5 to about 250 moles, and even more preferably from about 10 to about 100 moles per mole of the lanthanide compound. The resulting preformed catalyst composition can be aged, if desired, prior to being added to the monomer that is to be polymerized.

Third, the catalyst composition may be formed by using a two-stage procedure. The first stage involves reacting the lanthanide compound with the organoaluminum hydride and the trihydrocarbylaluminum either in the absence of any conjugated diene monomer or, preferably, in the presence of a small amount of at least one conjugated diene monomer at an appropriate temperature, which is generally from about −20° C. to about 80° C. The amount of conjugated diene monomer to be used in this first stage is generally the same as that amount used in the preforming of the catalyst as described above. In the second stage, the mixture prepared in the first stage and the halogen-containing compound are charged in either a stepwise or simultaneous manner to the monomer that is to be polymerized.

In any of the foregoing procedures, the organoaluminum hydride (ingredient b) and trihydrocarbylaluminum (ingredient c) may be preblended, i.e., the organoaluminum hydride is blended with the trihydrocarbylaluminum at a desired molar ratio prior to contacting the blend with the other catalyst ingredients or monomer. Or, the organoaluminum hydride and a trihydrocarbylaluminum can also be preblended in situ in the presence of the monomer that is to be polymerized.

The polymerization process of this invention is carried out within a bulk system, which generally refers to the fact that the system includes less than 20% by weight of organic solvent, more preferably less than about 10% by weight of organic solvent, even more preferably less than about 5% by weight of organic solvent, and still more preferably less than about 2% by weight of organic solvent based on the total weight of the monomer, polymer, and solvent within the system. In one embodiment, the process is carried out in the substantial absence of an organic solvent or diluent, which refers to the absence of that amount of solvent that would otherwise have an appreciable impact on the polymerization process. Stated another way, those skilled in the art will appreciate the benefits of bulk polymerization processes (i.e., processes where monomer acts as the solvent), and therefore the process of this invention is preferably conducted in the presence of less organic solvent than will deleteriously impact the benefits sought by conducting the process in bulk. In yet another embodiment, the polymerization system is devoid of organic solvent.

The term organic solvent or diluent is used herein conventionally; that is, it refers to organic compounds that will not polymerize or enter into the structure of the polymer to be produced. Typically, these organic solvents are inert to the catalyst composition. Exemplary organic solvents are hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Commercial mixtures of the above hydrocarbons may also be used. For environmental reasons, aliphatic and cycloaliphatic hydrocarbons are highly preferred. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer. The performance characteristics of the polymer are generally not affected appreciably when the content of high molecular weight hydrocarbons is less than about 5% by weight of the polymer.

In one embodiment, a small quantity of an organic solvent may be employed as a carrier to either dissolve or suspend the catalyst ingredients in order to facilitate the delivery of the catalyst ingredients to the polymerization system. In yet another embodiment, conjugated diene monomer can be used as the catalyst carrier.

The lanthanide-based catalyst composition utilized in this invention exhibits very high catalytic activity for polymerizing conjugated dienes. Although one preferred embodiment of this invention is directed toward the polymerization of 1,3-butadiene into cis-1,4-polybutadiene, the process of this invention can also be utilized for the polymerization of other conjugated dienes into polymers with a cis-1,4 microstructure. Some specific examples of other conjugated dienes that can be polymerized include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Further, the process of this invention can also be utilized for the copolymerization of two or more conjugated dienes into copolymers having a cis-1,4 microstructure.

The bulk polymerization of conjugated dienes according to this invention is conducted in the presence of a catalytically effective amount of the foregoing catalyst composition. The total catalyst concentration to be employed in the polymerization mass depends on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients should be used. Generally, the amount of the lanthanide compound used can be varied from about 0.001 to about 1 mmol, more preferably from about 0.005 to about 0.5 mmol, and even more preferably from about 0.01 to about 0.2 mmol per 100 g of conjugated diene monomer.

The bulk polymerization can be conducted in a conventional stirred-tank reactor if the conversion is to be limited to a level of less than about 50–60%. If a higher conversion is desired, then because of the presence of a highly viscous cement, it is preferable to employ an elongated reactor in which the cement under polymerization is driven to move by piston, or substantially by piston. For example, extruders in which the cement is pushed along by a self-cleaning single-screw or double-screw agitator are suitable for this purpose.

The bulk polymerization can be carried out as a batch process, a continuous process, or a semi-continuous process. In the semi-continuous process, the monomer is intermittently charged as needed to replace that monomer already polymerized. In any case, the polymerization is preferably conducted under anaerobic conditions. The polymerization temperature may be varied. However, due to the insolubility of cis-1,4-polybutadiene in 1,3-butadiene monomer at elevated temperatures, it is preferable to employ a low polymerization temperature in order to maintain the polymerization mass in a single-phase homogeneous system, which allows the polymer molecular weight to be rigorously controlled and gives a uniform polymer product. Thus, the polymerization temperature is preferably in a range of from about 0° C. to about 50° C., more preferably from about 5° C. to about 45° C., and even more preferably from about 10° C. to about 40° C. The heat of polymerization may be removed by external cooling with a thermally controlled reactor jacket, internal cooling by evaporation and condensation of the monomer through the use of a reflux condenser connected to the reactor, or a combination of the two methods. The pressures at which the polymerization is carried out are preferably those that ensure that the majority of monomer is in the liquid phase.

The bulk polymerization according to this invention can be carried out to any desired conversions before the polymerization is terminated. However, it is preferable to avoid the high cement viscosity resulting from high conversions, as well as the possible separation of polymer as a solid phase from the monomer at high conversions due to the limited solubility of, for example, cis-1,4-polybutadiene in 1,3-butadiene monomer. Accordingly, the conversion is preferably in the range of from about 5% to about 60%, more preferably from about 10% to about 40%, and even more preferably from about 15% to 30%, in order to maintain a single-phase homogeneous system.

Once a desired conversion is achieved, the polymerization can be stopped by adding a polymerization terminator that inactivates the catalyst. Typically, the terminator employed is a protic compound, which includes, but is not limited to, an alcohol, a carboxylic acid, an inorganic acid, water, or a mixture thereof. An antioxidant such as 2,6-di-tert-butyl-4-methylphenol is usually added along with, before, or after the addition of the terminator. The amount of the antioxidant employed is typically in the range of 0.2% to 1% by weight of the polymer product. The terminator and the antioxidant can be added as neat materials or, if necessary, dissolved in a hydrocarbon solvent or conjugated diene monomer prior to being added to the polymerization system.

Advantageously, the polymer prepared by the low-temperature bulk polymerization process of this invention displays an enhanced degree of pseudo-living characteristics in that, upon completion of the polymerization, a greater percentage of polymer chains possess reactive ends as compared to the polymer prepared by solution polymerization at high temperatures. Therefore, prior to adding the terminator and the antioxidant to the polymerization system as described above, a variety of coupling agents or functionalizing agents can be added to react with the reactive polymer chain ends so as to give modified cis-1,4-polydienes with tailored properties. Exemplary coupling or functionalizing agents include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides. These types of coupling and functionalizing agents are described in, among other places, U.S. patent application Ser. Nos. 10/296,084, 10/296,082, and 10/381,829; U.S. Pat. Nos. 4,906,706, 4,990,573, 5,064,910, 5,567,784, and 5,844,050; Japanese Patent Application Nos. 05-051406A, 05-059103A, 10-306113A, and 11-035633A, which are incorporated herein by reference. It is important to contact the pseudo-living polymer with the coupling or functionalizing agents prior to contacting the polymerization mixture with the terminator and the antioxidant. The amount of coupling or functionalizing agent is preferably in a range of from about 0.01 to about 100 moles, more preferably from about 0.1 to about 50 moles, and even more preferably from about 0.2 to about 25 moles per mole of the lanthanide compound.

When the polymerization has been stopped, the cis-1,4-polydiene product can be recovered from the polymerization mixture by using any conventional procedures of desolventization and drying that are known in the art. For instance, the polymer can be most conveniently recovered by passing the polymer cement through an adjacent heated screw apparatus (desolventizing extruder), in which the volatile substances are removed by evaporation at temperatures in the range of about 100° C. to about 170° C. and atmospheric or subatmospheic pressure. This treatment serves to remove the unreacted monomer, the low-boiling solvent introduced with the catalyst, as well as the terminator such as water introduced in excess of that required for the deactivation of the catalyst. Alternatively, the polymer can also be recovered by subjecting the polymer cement to steam desolventization, followed by drying the resulting polymer crumbs in a hot air tunnel. In any case, the unreacted monomer is isolated and recycled back to the process. The content of the volatile substances in the dried polymer is preferably below 1% and more preferably below 0.5% by weight of the polymer.

The bulk polymerization process of this invention provides enhanced stereoselectivity due to the low operation temperature, and therefore the resulting products, such as cis-1,4-polybutadiene, have a higher cis-1,4-linkage content than that of the polymer produced by solution polymerization at high temperatures. The cis-1,4-linkage is preferably in excess of about 97%, more preferably in excess of about 98%, and even more preferably in excess of about 99%.

Also, the polymers can advantageously be synthesized to have a number average molecular weight of about 40,000 to about 250,000, optionally about 60,000 to about 200,000, and optionally 80,000 to about 150,000. Stated another way, these polymers can be characterized by a Mooney Viscosity ($ML_{1+4}$) of about 10 to about 80, optionally about 20 to about 70, and optionally about 30 to about 50. Further, the molecular weight distribution of these polymers may be less than about 5, advantageously less than about 4, and more advantageously less than about 3.

The characteristics of the polymers produced according to this invention make them advantageous for a number of uses. For example, the cis-1,4-polybutadiene exhibits excellent viscoelastic properties and is particularly useful in the manufacture of various tire components including, but not limited to, tire treads, sidewalls, subtreads, and bead fillers. The cis-1,4-polybutadiene can be used as all or part of the elastomeric component of a tire stock. When the cis-1,4-polybutadiene is used in conjunction with other rubbers to form the elastomeric component of a tire stock, these other rubbers may be natural rubber, synthetic rubbers, and mixtures thereof. Examples of synthetic rubber include polyisoprene, poly(styrene-co-butadiene), polybutadiene with low cis-1,4 linkage content, poly(styrene-co-butadiene-co-isoprene), and mixtures thereof. The cis-1,4-polybutadiene can also be used in the manufacture of hoses, belts, shoe soles, window seals, other seals, vibration damping rubber, and other industrial products.

In order to demonstrate the practice of the present invention, the following examples have been prepared and tested. The examples should not, however, be viewed as limiting the scope of the invention. The claims will serve to define the invention.

EXAMPLES

Example 1

The polymerization reactor included a one-gallon stainless cylinder equipped with a mechanical agitator (shaft and blades) capable of mixing high viscosity polymer cement. The top of the reactor was connected to a reflux condenser system for condensing and recycling the 1,3-butadiene vapor developed inside the reactor throughout the duration of the polymerization. The reactor was also equipped with a cooling jacket with cold water running through. The heat of polymerization was dissipated partly by internal cooling via a the reflux condenser system, and partly by external cooling through heat transfer to the cooling jacket.

The reactor was thoroughly purged with a stream of dry nitrogen, which was then replaced with 1,3-butadiene vapor by charging 65 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer was charged into the reactor. After the monomer was thermostated at 32° C., 1.9 mL of 1.0 M diisobutylaluminum hydride (DIBAH) in hexane and 11.4 mL of 0.68 M tri-isobutylaluminum (TIBA) in hexane, with the molar ratio of DIBAH to TIBA being 20:80, were sequentially charged into the reactor, followed by the addition of 4.5 mL of 0.054 M neodymium(III) neodecanoate ($NdV_3$). After the mixture inside the reactor was allowed to age for 5 minutes, the polymerization was started by charging 4.9 mL of 0.10 M ethylaluminum dichloride in hexane into the reactor. After 15 minutes from its commencement, the polymerization was terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 131.5 g (10.1% conversion). The Mooney viscosity ($ML_{1+4}$) of the polymer was determined to be 30.6 at 100° C. by using a Monsanto Mooney viscometer with a large rotor, a one-minute warm-up time, and a four-minute running time. As determined by gel permeation chromatography (GPC), the polymer had a number average molecular weight ($M_n$) of 121,000, a weight average molecular weight ($M_w$) of 362,000, and a molecular weight distribution ($M_w/M_n$) of 3.0. The infrared spectroscopic analysis of the polymer indicated a cis-1,4-linkage content of 98.7%, a trans-1,4-linkage content of 1.0%, and a 1,2-linkage content of 0.3%.

The % conversion divided by the polymerization time (i.e., % conversion/minute) can be taken as a rough indication of the catalyst activity, with a higher value of % conversion/minute corresponding to a higher catalyst activity. The Mooney viscosity value divided by % conversion (i.e., $ML_{1+4}$/% conversion) can be taken as a rough measure of the dependency of Mooney viscosity on % conversion. A higher value of $ML_{1+4}$/% conversion means that the catalyst has a greater tendency to produce a polymer of higher molecular weight.

The monomer charge, the amounts and ratios of the catalyst ingredients, the % conversion, the properties of the resulting cis-1,4-polybutadiene, as well as the values of % conversion/minute and $ML_{1+4}$/% conversion are summarized in Table I.

TABLE I

| | Example No. | | | | |
|---|---|---|---|---|---|
| | 1 | 2 | 3 | 4 | 5 |
| 1,3-Butadiene (g) | 1302 | 1302 | 1302 | 1302 | 1302 |
| $NdV_3$ (mmol) | 0.243 | 0.243 | 0.243 | 0.243 | 0.243 |
| DIBAH/TIBA molar ratio | 20:80 | 25:75 | 0:100 | 0:100 | 100:0 |
| Nd/Al/Cl molar ratio | 1:40:4 | 1:40:4 | 1:40:4 | 1:70:4 | 1:40:4 |
| Polymerization time (minutes) | 15.0 | 18.0 | 18.0 | 14.7 | 23.0 |
| % Conversion | 10.1 | 12.1 | 8.6 | 10.1 | 11.2 |
| % Conversion/Minute | 0.67 | 0.67 | 0.48 | 0.69 | 0.49 |
| Mooney viscosity ($ML_{1+4}$) | 30.6 | 26.1 | 67.4 | 22.8 | 6.3 |
| $ML_{1+4}$/% Conversion | 3.03 | 2.16 | 7.84 | 2.26 | 0.56 |
| $M_n$ | 121,000 | 123,000 | 171,000 | 115,000 | 36,000 |
| $M_w$ | 362,000 | 395,000 | 452,00 | 348,000 | 322,000 |
| MWD ($M_w/M_n$) | 3.0 | 3.2 | 2.7 | 3.0 | 8.9 |
| Polymer microstructure: | | | | | |
| cis-1,4-linkage content (%) | 98.7 | 98.9 | 98.8 | 98.8 | 98.2 |
| trans-1,4-linkage content (%) | 1.0 | 0.9 | 1.0 | 0.9 | 1.3 |
| 1,2-linkage content (%) | 0.3 | 0.2 | 0.2 | 0.3 | 0.5 |

Example 2

In Examples 2, the procedure described in Example 1 was repeated except that 2.4 mL of 1.0 M DIBAH in hexane and 10.7 mL of 0.68 M TIBA in hexane were used as the alkylating agent for the catalyst system, with the molar ratio of DIBAH to TIBA being 25:75. The experimental data are summarized in Table I.

The results obtained in Examples 1 and 2 indicate that the use of a combination of DIBAH and TIBA as the alkylating agent in catalyst system is advantageous in that cis-1,4-polybutadiene having narrow molecular weight distributions and commercially desirable Mooney viscosities can be conveniently produced without using excessively high Al/Nd ratios.

Examples 3 and 4

Comparative Examples

In Examples 3 and 4, the procedure described in Example 1 was repeated except that TIBA was used in place of the combination of DIBAH and TIBA as the alkylating agent for the catalyst system. The experimental data are summarized in Table I. The results obtained in Examples 3 show that the use of TIBA alone as the alkylating agent for the lanthanide-based catalyst system in low-temperature bulk polymerization of 1,3-butadiene has the tendency to generate cis-1,4-polybutadiene having an excessively high molecular weight and high Mooney viscosity, as indicated by the high value of $ML_{1+4}$/% conversion. The results obtained in Example 4 show that a very high Al/Nd molar ratio is needed in order to reduce the Mooney viscosity to a commercially desirable level.

Example 5

Comparative Example

In Example 5, the procedure described in Example 1 was repeated except that DIBAH was used in place of the combination of DIBAH and TIBA as the alkylating agent for the catalyst system. The experimental data are summarized in Table I. The results obtained in Example 5 show that the use of DIBAH alone as the alkylating agent in the catalyst system is disadvantageous in that it results in a polymer having an undesirably broad molecular weight distribution of 8.9.

Furthermore, a comparison of the results obtained in Examples 1 and 2 with those obtained in Examples 3 and 5 indicates that the combination of TIBA and DIBAH gives a synergistic effect in terms of catalyst activity. Namely, at the same Nd/Al/Cl molar ratio of 1:40:4, the catalyst that uses a combination of DIBAH and TIBA as the alkylating agent (Examples 1 and 2) gives higher activity, which is indicated by the higher values of % conversion/minute, than the catalyst using TIBA alone as the alkylating agent (Example 3) or the catalyst using DIBAH alone as the alkylating agent (Example 5).

Various modifications and alterations that do not depart from the scope and spirit of this invention will become apparent to those skilled in the art. This invention is not to be duly limited to the illustrative embodiments set forth herein.

What is claimed is:

1. A method of producing cis-1,4-polydienes, the method comprising the step of:
    contacting conjugated diene monomer, where the conjugated diene monomer is in the liquid phase, with a lanthanide-based catalyst system in the presence of less than 20% by weight of organic solvent based on the total weight of monomer, organic solvent, and resulting polymer, where the lanthanide-based catalyst system includes the combination of or reaction product of (a) a lanthanide compound, (b) an organoaluminum hydride, (c) a trihydrocarbylaluminum, and (d) a halogen-containing compound.

2. The method of claim 1, where the conjugated diene monomer is 1,3-butadiene, thereby forming cis-1,4-polybutadiene.

3. The method of claim 2, where said step of contacting takes place in the presence of less than 5% by weight of organic solvent based on the total weight of the monomer, organic solvent, and resulting polymer.

4. The method of claim 2, where the molar ratio of the organoaluminum hydride to the trihydrocarbylaluminum is from about 5:95 to about 80:20.

5. The method of claim 4, where the molar ratio of the organoaluminum hydride to the trihydrocarbylaluminum is from about 10:90 to about 50:50.

6. The method of claim 5, where the amount of the lanthanide compound is from about 0.00 1 to about 1 mmol per 100 gram of 1,3-butadiene monomer.

7. The method of claim 6, where the amount of the lanthanide compound is from about 0.005 to about 0.5 mmol of lanthanide compound per 100 gram of 1,3-butadiene monomer.

8. The method of claim 2, where the molar ratio of the organoaluminum hydride and the trihydrocarbylaluminum to the lanthanide compound is from about 4:1 to about 200:1.

9. The method of claim 8, where the molar ratio of the organoaluminum hydride and the trihydrocarbylaluminum to the lanthanide compound is from about 10:1 to about 100:1.

10. The method of claim 2, where the molar ratio of the halogen-containing compound to the lanthanide compound is from about 0.5:1 to about 20:1.

11. The method of claim 10, where the molar ratio of the halogen-containing compound to the lanthanide compound is from about 1:1 to about 10:1.

12. The method of claim 1, where said lanthanide-based catalyst system is prepared by separately adding the lanthanide compound, the organoaluminum hydride, the trihydrocarbylaluminum, and the halogen-containing compound to the monomer.

13. The method of claim 1, where said lanthanide-based catalyst system is prepared by pre-mixing, outside the presence of the monomer, the lanthanide compound, the organoaluniinum hydride, the trihydrocarbylaluminum, and the halogen-containing compound.

14. The method of claim 1, where said lanthanide-based catalyst system is prepared by pre-mixing the lanthanide compound, the organoaluminum hydride, the trihydrocarbylaluminum, and the halogen-containing compound in the presence of 1 to about 500 moles of conjugated diene monomer per mole of the lanthanide compound.

15. The method of claim 1, where said lanthanide-based catalyst system is prepared by first combining the lanthanide compound with the organoaluminum hydride and the trihydrocarbylaluminum to form an initial composition, followed by combining the initial composition with the halogen-containing compound.

16. The method of claim 15, where said step of first combining the lanthanide compound with the organoaluminum hydride and the trihydrocarbylaluminum takes place in the absence of monomer.

17. The method of claim 15, where said step of first combining the lanthanide compound with the organoaluminum hydride and the trihydrocarbylaluminum takes place in the presence of 1 to about 500 moles of conjugated diene monomer per mole of the lanthanide compound.

18. The method of claim 2, where said step of contacting 1,3-butadiene monomer with the lanthanide-based catalyst system occurs in a temperature range from about 0° C. to about 50° C.

19. The method of claim 1, where the monomer, polymer, organic solvent, and catalyst system form a cement.

20. The method of claim 1, where the organic solvent consists essentially of compounds that will not polymerize or enter into the structure of the polymer.

21. A process for producing polydienes, the process comprising:
    polymerizing a conjugated diene monomer by employing the lanthanide-based catalyst system, where the step of polymerizing takes place at a temperature of from about 0° C. to about 50° C. and a pressure sufficient to maintain a majority of the monomer in the liquid phase, where said step of polymerizing takes place in the presence of less than 20% by weight organic solvent based upon the total weight of the monomer, organic solvent, and resulting polydiene, and where the lanthanide-based catalyst system includes the combination of or reaction product of (a) a lanthanide compound, (b) an organoaluminuin hydride, (c) a trihydrocarbylaluntinum, and (d) a halogen-containing compound.

* * * * *